United States Patent
Ross et al.

[11] Patent Number: 6,109,421
[45] Date of Patent: Aug. 29, 2000

[54] CORN TRANSFER AND ALIGNMENT APPARATUS

[75] Inventors: Edward E. Ross, San Rafael, Calif.; Dennis R. Beland, Owatonna, Minn.; Craig A. Furlo, Colorado Springs; M. Scott Howarth, Pueblo, both of Colo.; Brian E. Knutson, Burnsville, Minn.; James W. Laughton, Pueblo West, Colo.; David R. Laydon; Stefan F. Molenaar, both of Pueblo, Colo.; Robert C. Solum, Richland, Wash.; Alan D. Stender, Pueblo, Colo.

[73] Assignee: Magnuson Corporation, Pueblo, Colo.

[21] Appl. No.: 09/100,550

[22] Filed: Jun. 19, 1998

[51] Int. Cl.[7] .................................................. B65G 47/04
[52] U.S. Cl. ....................................... 198/457.07; 198/723
[58] Field of Search ......................... 198/457.05, 457.06, 198/457.07, 723, 370.04

[56] References Cited

U.S. PATENT DOCUMENTS

| | | | |
|---|---|---|---|
| 1,876,307 | 9/1932 | Langbein | 198/779 |
| 1,885,892 | 11/1932 | Bronander | 198/457.07 |
| 1,974,032 | 9/1934 | Molins | 198/457.07 |
| 2,823,787 | 2/1958 | Morgan | 198/32 |
| 2,991,687 | 7/1961 | Henebry | 88/14 |
| 2,991,881 | 7/1961 | Craven | 209/75 |
| 3,024,889 | 3/1962 | Reading | 198/399 |
| 3,227,260 | 1/1966 | Graves et al. | 198/25 |
| 3,272,309 | 9/1966 | Reading | 198/25 |
| 3,289,808 | 12/1966 | Simmons | 198/399 |
| 3,326,351 | 6/1967 | Ross et al. | 198/45 |
| 3,394,805 | 7/1968 | Ross et al. | 209/73 |
| 3,613,868 | 10/1971 | Rickerd | 198/211 |
| 3,638,777 | 2/1972 | Fluck | 198/20 |
| 3,695,462 | 10/1972 | Sullivan | 214/16 B |
| 3,741,371 | 6/1973 | Oldershaw et al. | 198/38 |
| 3,874,498 | 4/1975 | Cover et al. | 198/399 |
| 4,036,355 | 7/1977 | Valli | 198/607 |
| 4,187,545 | 2/1980 | Wallace et al. | 364/559 |
| 4,207,974 | 6/1980 | Dragotta | 198/344 |
| 4,216,854 | 8/1980 | McCoy | 198/481 |
| 4,225,031 | 9/1980 | Frisbie et al. | 198/395 |
| 4,413,722 | 11/1983 | Frisbie et al. | 198/392 |
| 4,416,435 | 11/1983 | Szendrodi et al. | 244/114 R |
| 4,597,491 | 7/1986 | Conklin | 198/642 |
| 4,765,940 | 8/1988 | Circelli et al. | 264/339 |
| 4,836,355 | 6/1989 | Blanc | 198/418.6 |
| 5,065,857 | 11/1991 | Lehtola | 198/457 |
| 5,167,317 | 12/1992 | Van Der Schoot et al. | 198/469.1 |
| 5,238,121 | 8/1993 | Frisbie | 209/539 |
| 5,372,236 | 12/1994 | Layer | 198/392 |
| 5,819,517 | 10/1998 | Amanatidis et al. | 56/341 |

Primary Examiner—Christopher P. Ellis
Assistant Examiner—Rashmi Sharma
Attorney, Agent, or Firm—Bruce H. Johnsonbaugh

[57] ABSTRACT

A corn transfer and alignment mechanism for preparing ears for being sawn into cobbettes is provided. The ears are received by the transfer mechanism from a feed conveyor on which the ears are conveyed singularly with their tip ends first. The transfer station uses a transfer plate and stabilizer drum to reduce the forward momentum of the ears and align the tips of the ears against a guide plate. The aligned ears are then discharged onto a roller conveyor for presentation to trimming saws.

14 Claims, 6 Drawing Sheets

CORN TRANSFER AND ALIGNMENT APPARATUS

BACKGROUND AND BRIEF SUMMARY

The present invention relates in general to an apparatus for automatically processing ears of corn into cobbettes. Ears of corn must be conveyed through trimming saws transversely to be cut into cobbettes. In order to maximize yield and avoid waste, each ear should be aligned relative to the trimming saws so that the center portion of the ear becomes the cobbette. The present invention achieves the desired alignment by using the tip end of each ear as a reference point, and guiding the tip end relative to the trimming saws. The tip ends are used as a reference point by first orienting the ears into a "tip end first" position. The ears exit the orientor moving longitudinally (i.e. in a direction parallel with their longitudinal axes) at high speed and tip end first. The problem then becomes twofold: first, how to transfer the oriented ears moving longitudinally at high speed onto a conveyor which moves the ears transversely through the trimming saws; and, second, how to simultaneously align the ears relative to the trimming saws.

It is inherently difficult to abruptly and reliably accomplish a change of direction with ears of corn moving longitudinally at relatively high speeds for several reasons. First, the tip end is pointed and generally triangularly shaped and, when it contacts an obstruction, the triangular shape tends to cause the ear to rotate sideways about its tip end. Secondly, the center of gravity of each ear of corn is located rearwardly from its tip a considerable distance, further aggravating the tendency of the corn to rotate sideways about its tip when impacting an obstruction.

The present invention provides a transfer and alignment apparatus for receiving singulated, oriented ears longitudinally discharged from a feed conveyor. The present invention quickly reduces the forward momentum of the ears, aligns the tip ends, and discharges the aligned ears onto a second conveyor moving in a direction perpendicular to the feed conveyor. On the second conveyor, the aligned ears are passed through the trimming saws and cut into cobbettes.

The transfer unit and alignment mechanism of the present invention increases yield and throughput capacity while simultaneously reducing jams or blockages in the movement of the ears of corn.

The prior art includes U.S. Pat. No. 5,238,121 dated Aug. 24, 1993, which teaches a relatively complex mechanism for aligning ears of corn for presentation to a saw. The alignment mechanism is shown in part at FIGS. 10–14 of that patent and includes relatively cumbersome and complicated movable clamps 45 for grasping individual ears of corn. The clamps then interact with camming ramps 50a and 50b to present the ears properly to the trimming saws.

The prior art also includes a corn transfer unit being sold by A & K Development Company of Eugene, Oreg. The A & K device utilizes a feed conveyor discharging ears longitudinally onto a transversely mounted bar conveyor which carries the corn to the trimming saws. The A & K mechanism discharges the corn from the feed conveyor at between 120 and 160 feet per minute, and the corn impacts the transversely moving bar conveyor at a sufficiently high speed and with sufficient energy that frequently ears of corn bounce backwardly after impacting the bar conveyor or its side rails, or become misoriented sideways on the bar conveyor. Misoriented ears of corn on the bar conveyor cause frequent jams at the transfer point, resulting in lost time, greatly increased expense in operating the system and reduced yield.

In contrast to the prior art, the present invention provides a relatively simple and reliable apparatus for receiving singulated ears of corn discharged longitudinally from a feed conveyor, aligning the tip ends adjacent a guide plate, and discharging the ears transversely onto a roller conveyor with tips aligned adjacent a guide plate for presentation to a trimming saw.

A primary object of the invention is to provide a corn transfer and alignment apparatus for transferring ears of corn from a highspeed feed conveyor onto a transversely oriented roller conveyor wherein the ears of corn are aligned on the roller conveyor for presentation to trimming saws.

A further object of the invention is to provide an extremely reliable corn transfer unit wherein the transfer is made from a highspeed feed conveyor to a transversely oriented roller conveyor wherein the instances of jamming caused by misoriented ears of corn is greatly reduced.

A further object of the invention is to provide a corn transfer unit capable of operating reliably at higher feed rates and throughput rates than systems known in the art.

Another object of the invention is to provide a corn transfer and alignment system wherein corn is fed into the transfer unit longitudinally, tip end first and the momentum of the corn is reduced by frictional engagement with a transfer plate and rotating stabilizer drum so that the tip end of each ear of corn may be aligned adjacent a guide plate without bouncing backward or becoming misoriented.

Another object is to provide a transfer system that simultaneously reduces the longitudinal velocity of the corn and increases the transverse velocity of the corn for discharge onto a transverse conveyor.

A further object of the invention is to provide a corn transfer unit which stabilizes the ears of corn as those ears make an abrupt ninety degree transition in motion from a relatively high speed longitudinal motion to a transverse motion wherein they are presented to trimming saws.

Further objects and advantages of the invention will become apparent from the following description and drawings wherein:

DETAILED DESCRIPTION OF THE DRAWINGS

Figure 1:
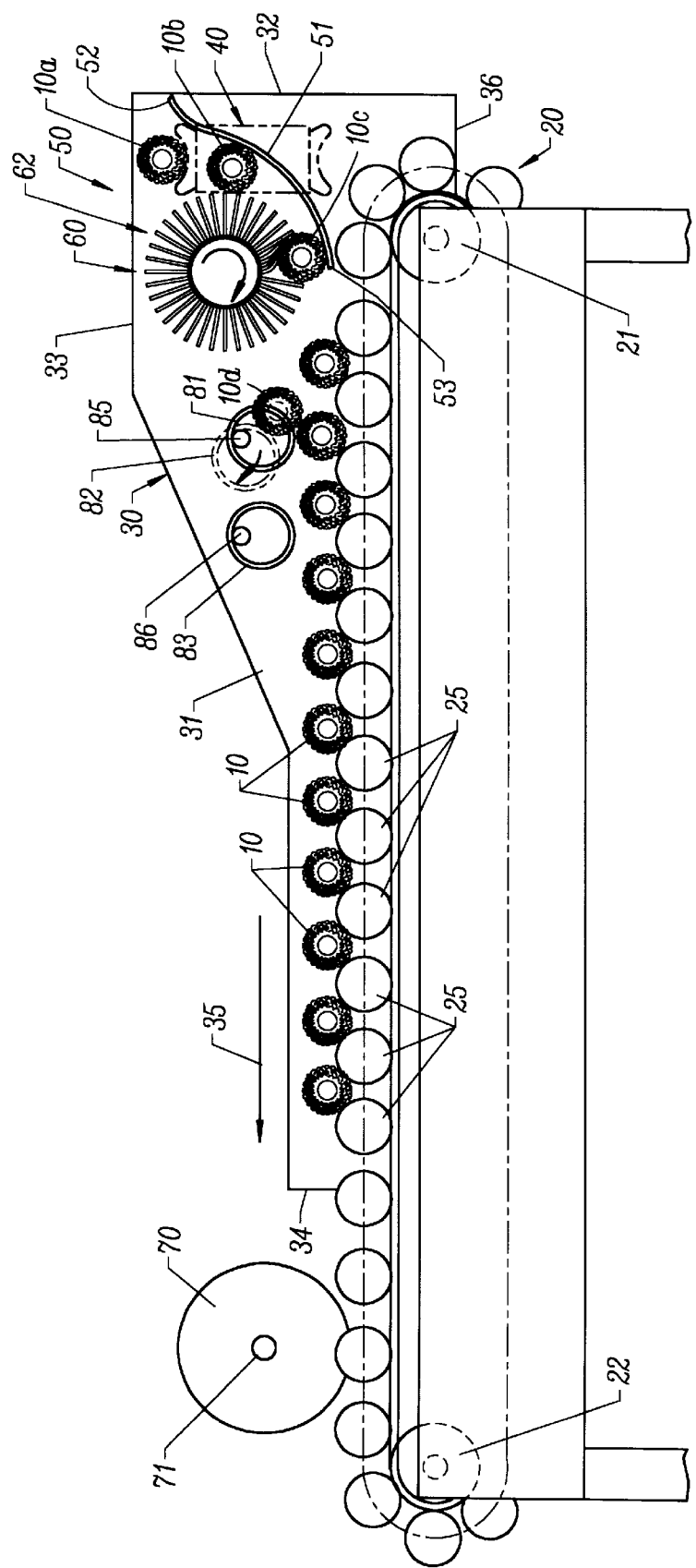
FIG. 1 is a side elevational view of the invention showing ears of corn moving towards a saw trimming station and ears of corn being fed from a feed conveyor through the transfer and alignment system of the present invention.

FIGS. 1–4 of the drawings illustrate a first embodiment of the invention. A roller conveyor means shown generally as 20 includes a plurality of axially spaced rollers 25 conveying ears of corn 10 in the direction of arrow 35. Rollers 25 form an endless conveyor extending from the input sprocket or wheel 21 along a generally horizontal path to exit sprocket or wheel 22. The individual rollers 25 are sized and spaced so that individual ears of corn 10 settle between two adjacent rollers 25. The diameter of rollers 25 is preferably two to three inches. Roller conveyor means 20 conveys ears 10 to a trimming saw (or saws) 70. The longitudinal axes of ears 10 are positioned transversely to the direction of travel 35 of conveyor 20.

A guide plate means 30 is positioned adjacent the roller conveyor means 20 and extends longitudinally from its first leading edge 32 to its second trailing edge 34 which is adjacent trimming saw 70. It is understood that trimming saw 70 may comprise two or more blades. The purpose of trimming saw 70 is to cut each ear of corn 10 into one or more cobbettes of predetermined length. The cobbettes are then sold as a fast food item or as a frozen food item, for example. Guide plate means 30 has an upper edge 33 which, as shown in the drawings, extends above the feed conveyor means 40 and a lower edge 36 positioned at approximately the same height as the center of the roller conveyor 20. The upper edge 33 may be located at a lower height, for example, slightly below the discharge end 41 of feed conveyor means 40. The purpose of guide plate means 30 is to align the tip ends 11 of the ears of corn for presentation to trimming saw 70.

Figure 2:
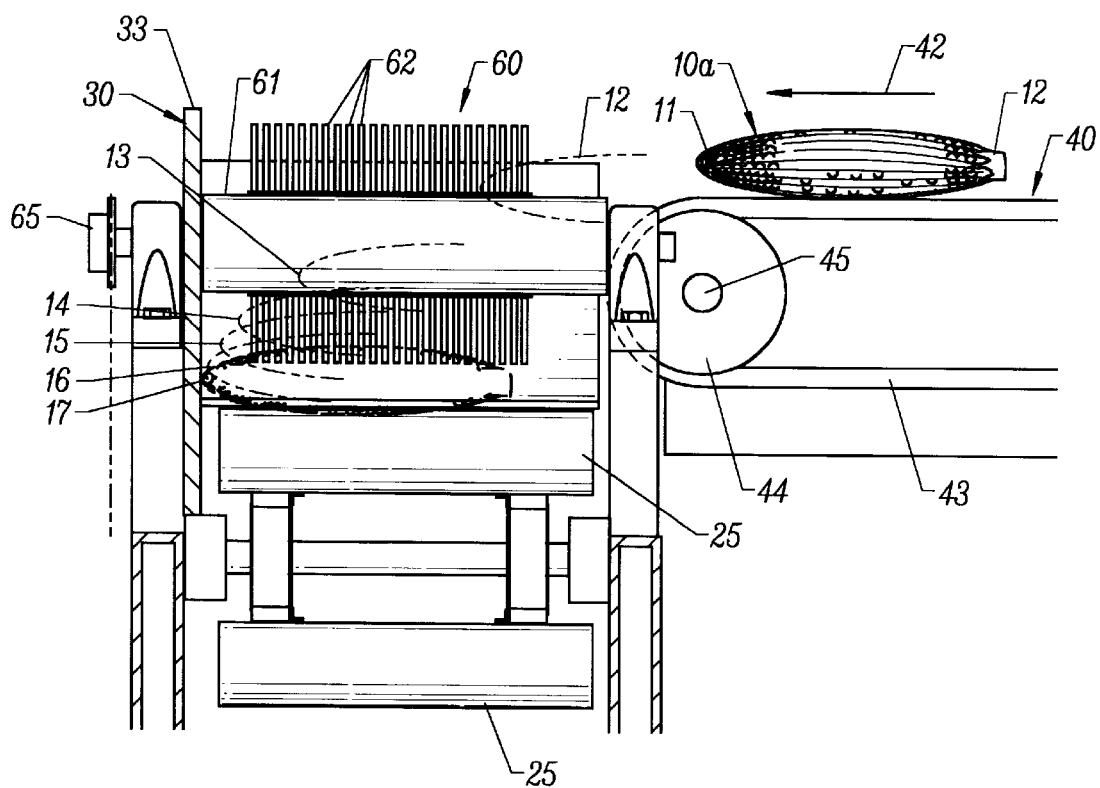
FIG. 2 is a side elevational view, partially in section, showing an ear of corn being discharged from a feed conveyor into the transfer unit of the present invention, and which shows schematically how the forward velocity and momentum of the corn is reduced as it passes through the transfer unit.
Figure 3:
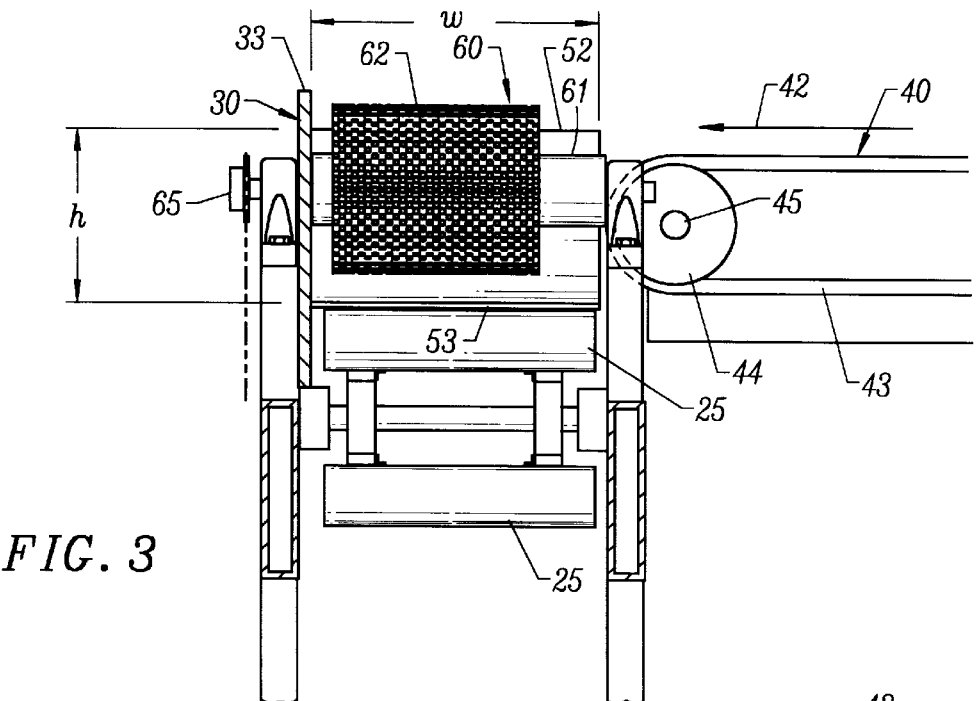
FIG. 3 is a side elevational view, partially in section, of that portion of the apparatus shown in FIG. 2.
Figure 4:
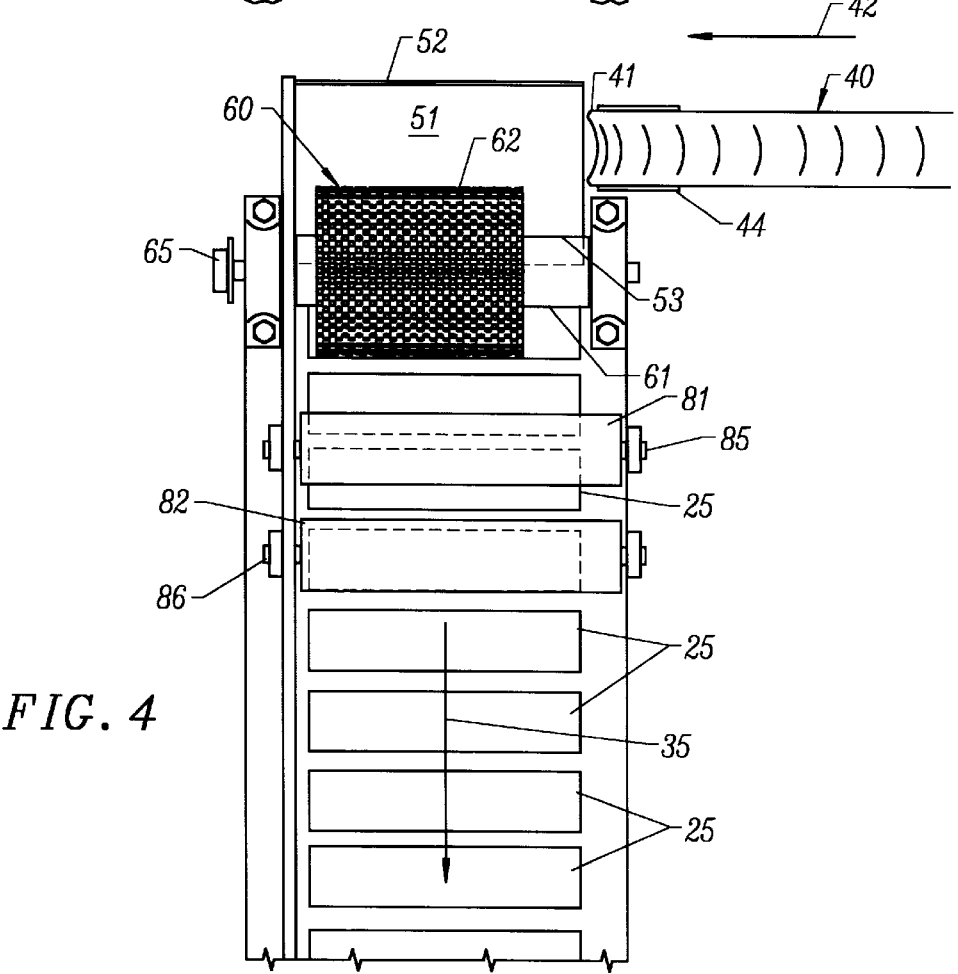
FIG. 4 is a plan view of the invention.

The feed conveyor means 40 shown in phantom in FIG. 1 conveys singulated ears of corn preferably oriented tip end 11 first as shown in FIG. 2, and moving in the direction shown by arrow 42 parallel to the longitudinal axis of the corn. The corn is preferably oriented and singulated before it reaches the discharge end 41 of the feed conveyor (FIG. 4). It is preferable to orient the tip ends 11 forward as shown in FIG. 2 so that the tip ends can be brought into registration and alignment with guide plate 30. The tip end 11 is a more reliable reference point than the butt end 12 because the butt end 12 typically includes stalk of various lengths and is, therefore, not a reliable reference point. It is possible that the present invention could be utilized with ears of corn that have not had their tip ends oriented forwardly, but the resulting yield of usable cobbettes would be less. The ears 10 may be oriented tip end forward by known orientors, including those shown in U.S. Pat. Nos. 4,225,031 and 4,413,722, incorporated herein by reference as though set forth in full.

As shown best in FIG. 4, feed conveyor means 40 conveys the singulated and preferably oriented ears of corn along a pathway 42 parallel to the longitudinal axes of the ears of corn and wherein the feed direction 42 is perpendicular to the direction of travel of roller conveyor means 20 as shown by arrow 35. The discharge end 41 of feed conveyor means 40 is positioned at a point adjacent to and above the roller conveyor means 20 as shown best in FIG. 1. The height differential is utilized in part to assist in accelerating the corn in the direction of travel 35 of roller conveyor means 20 after the corn is launched off the feed conveyor means 40.

The transfer means shown generally as 60 receives the ears of corn 10 discharged from the feed conveyor 40 and transfers those ears of corn 10 onto the roller conveyor as shown generally in FIGS. 1 and 2. Transfer means 50 includes transfer plate 51 and rotating stabilizer drum means 60. Transfer plate 51 has an upper inlet end 52 and a lower discharge end 53. Transfer plate 51 is preferably metallic and is curved downwardly as shown in FIG. 1 so that the distance between the discharge end 53 and the fingers 62 of the rotating stabilizer drum means 60 is such that the plate 51 and fingers 62 frictionally engage the ears of corn to reduce the forward velocity and momentum of the corn, to maintain the alignment of the longitudinal axes of the ears of corn and to assist in settling the corn onto the roller conveyor means 20. As shown best in FIG. 2, the individual ear of corn 10a is shown in phantom sliding across transfer plate 51 at positions 12,13,14,15,16 and 17 which represent equal intervals of time between the positions shown in phantom. As the ear 10a reaches the discharge end 41 of feed conveyor 40, it is in the position shown in FIGS. 1 and 2. After the ear 10a clears the discharge end 41 of feed conveyor 40 and reaches the position shown in phantom as 13, it frictionally engages the transfer plate 51 and fingers 62. Ear 10b in FIG. 1 is also shown beginning its frictional engagement with transfer plate 51 and fingers 62. The frictional engagement with transfer plate 51 and fingers 62 quickly reduces the velocity and momentum of the ear in its forward or longitudinal direction 42 so that it contacts guide plate means 30 at a relatively slow forward velocity. This is a very significant aspect of the invention because the ears are typically discharged from feed conveyor 40 at speeds of 150 to 250 feet per minute and, perhaps, at greater speeds. The transfer unit of the present invention allows the use of significantly increased speeds of the feed conveyor means 40, resulting in reduced cost and greater overall throughput, efficiency and higher yield of usable cobbettes in a given time frame.

The rotating stabilizer drum means 60 includes a cylindrical body 61 which rotates in a direction so that the fingers move downwardly against the ears of corn on transfer plate 51 as shown best in FIG. 1. Cylindrical drum 61 is driven by a chain or belt driven sprocket or gear 65. Fingers 62 in the preferred embodiment are rubber fingers which extend radially outwardly from cylindrical body 61.

Figure 5:
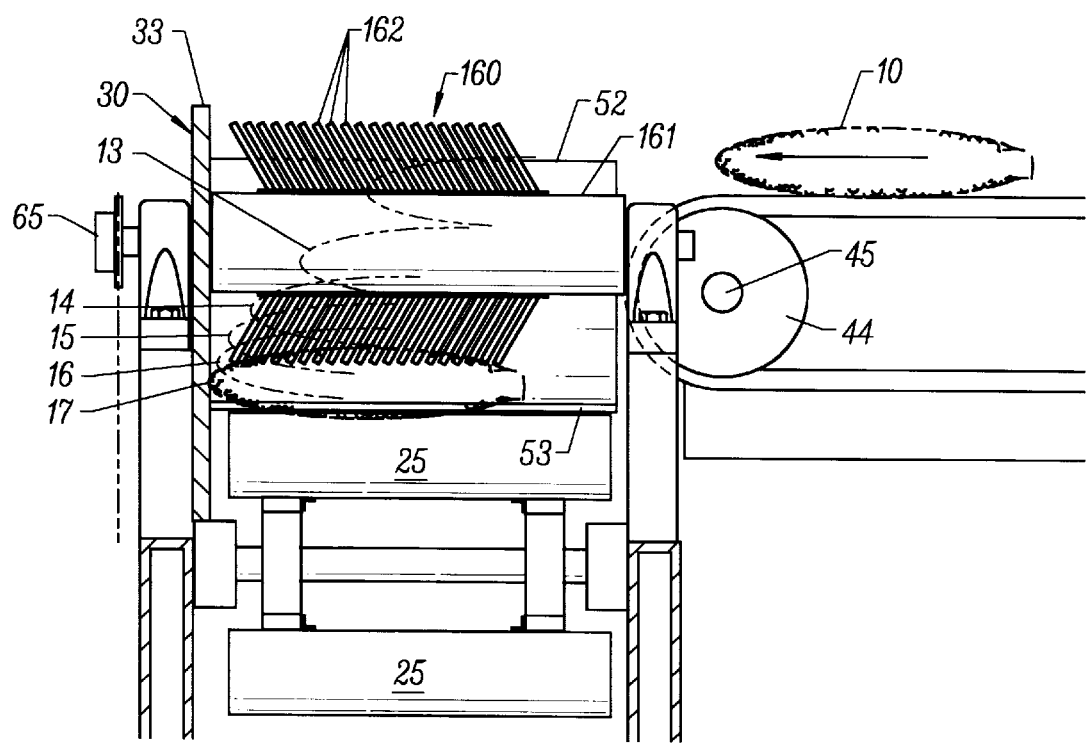
FIG. 5 is a side elevational view, partially in section, of an alternate embodiment of the invention.

An alternative form of the invention is shown in FIG. 5 wherein the rotating stabilizer drum means 160 has a plurality of fingers 162 angularly carried by cylindrical body 161. By mounting the fingers 162 so that they extend angularly from the surface of body 161 towards guide plate means 30, the fingers 162 urge the ear of corn 10 towards guide plate 30 and also resists any tendency of the ears to bounce backwardly away from guide plate means 30.

Transfer plate 51 and rotating stabilizer drum means 60 also perform the function of accelerating the ears of corn 10 in the direction of travel 35 of roller conveyor means 20. For example, ear 10c in FIG. 1 is about to be discharged onto roller conveyor means 20 and its velocity in the direction of travel 35 of roller conveyor means 20 is ideally the same as the velocity of the conveyor 20.

The inlet end 52 of transfer plate 51 is spaced apart from fingers 62 sufficiently so that each ear of corn is allowed to clear the discharge end of feed conveyor 40 before it frictionally engages transfer plate 51 and fingers 62. Each ear of corn slides downwardly and across transfer plate 51 onto roller conveyor means 20, as shown best in FIG. 2. It is understood that the spacing of the transfer plate from fingers 62 and the stiffness of the resilient fingers 62 may be readily modified as the speed of feed conveyor means 40 is increased or decreased. Also, the overall height "h" and width "w" of transfer plate 51 (FIG. 3) may be modified as the speed of feed conveyor 40 and roller conveyor 20 are increased or decreased.

Secondary stabilizer cylinders 81 and 82 are carried by support rods 85 and 86 to assist in settling the ears of corn between adjacent rollers 25. If, for example, an ear is deflected into the position shown by ear 10d in FIG. 1, cylinder 81 is urged upwardly into the position shown in phantom as 82, wherein cylinder 81 resists downstream travel of ear 10d. Ear 10d will be urged into the next open position between adjacent rollers 25.

Figure 6:
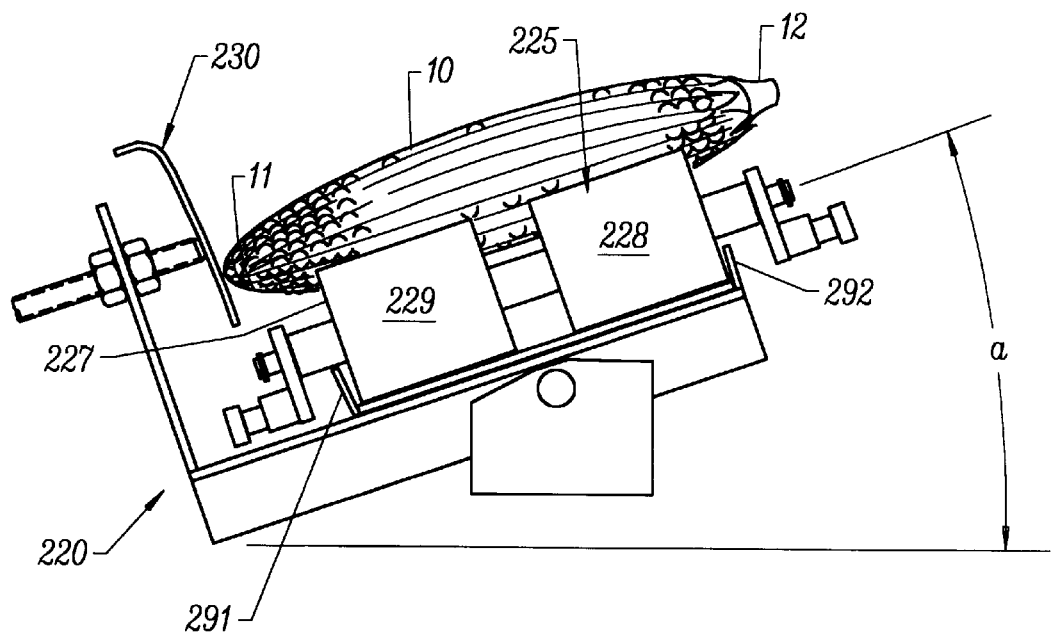
FIG. 6 is an elevational view showing schematically an alternate form of a portion of the invention.
Figure 7:
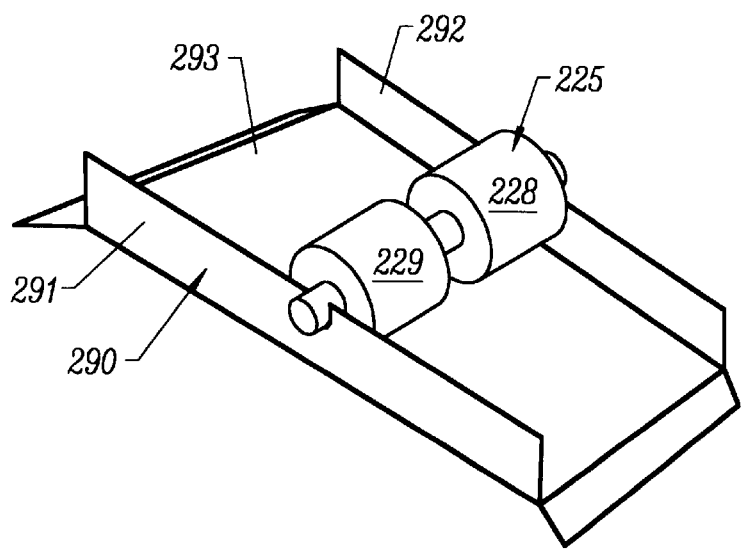
FIG. 7 is a perspective view showing schematically a portion of the apparatus shown in FIG. 6.
Figure 8:
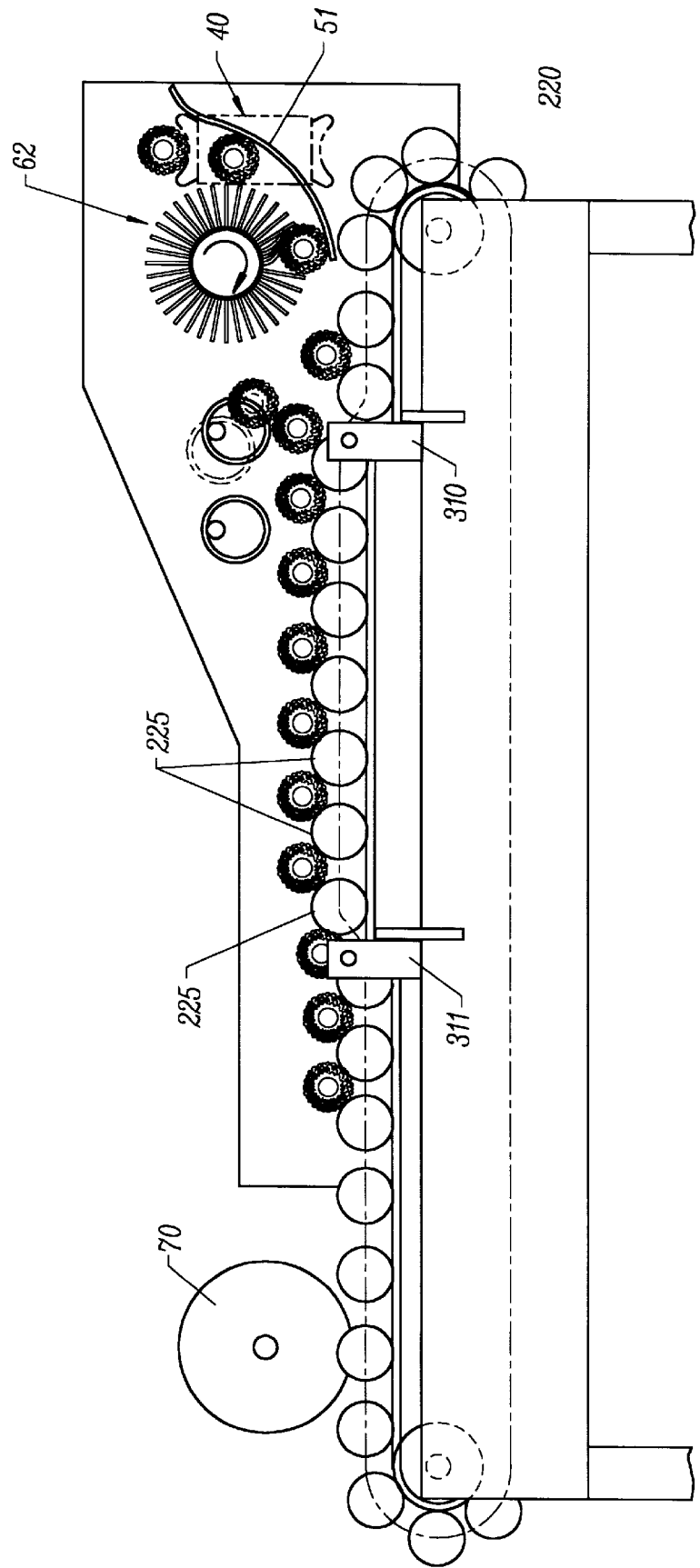
FIG. 8 is an elevational view showing an alternate embodiment of the invention utilizing the features shown in FIGS. 6 and 7.

FIGS. 6, 7 and 8 show a further embodiment of the invention. In this embodiment, a section of the roller conveyor means is inclined to tilt the rollers relative to the horizontal between zero and 30°. As shown in FIG. 6, the rollers 225 are two part rollers including rollers 228 and 229, and are inclined relative to horizontal by an angle a, resulting in elevating the butt end of the corn 12 above the tip end 11 to provide a gravity assist to help keep the tips 11 aligned with guide plate means 230.

A relatively U-shaped roller carrier plate 290 is provided having upstanding side plates 291 and 292 which extend in the direction of travel 35 of the roller conveyor means 220. Side plates 291 and 292 are connected to a base plate 293. The base plate 293 causes the rollers 228 and 229 to turn and the turning or rotation of rollers 228 and 229 further assists in aligning the tip ends against the guide plate. The downward edge 227 of roller 229 runs against side plate 291 and assists the rollers 225 in moving parallel to guide plate 230.

As shown in FIG. 8, rollers 225 are inclined and carried by roller carrier plate 290 between supports 310 and 311. After the rollers reach the downstream support 311, the rollers again become horizontal for presenting the ears to the trimming saws. The roller carrier plate can be extended upstream to the point where ears are discharged from the transfer plate to the roller conveyor means. As shown best in FIG. 6, the guide plate means 230 is inclined adjacent those portions of the roller conveyor means 220 which are inclined. Alternately, the roller conveyor means 220 can be horizontal at the point where ears are received from the transfer plate and then become inclined at first support 310 and remain inclined until the rollers reach the second support 311, as shown in FIG. 8. The inclined rollers assist somewhat in holding the tips of the ears in proper alignment against the guide plate means 230.

It is to be understood that various modifications of design can be made without departing from the spirit of this invention. For example, the stabilizer drum means 60 may be omitted in some situations. As another example, the stabilizer drum means 60 could include a cylindrical body which carried resilient and soft material such as foam, or a plastic mesh, rather than individual resilient fingers 62. Also, fingers 62 could be arranged in a helical path around the drum. Similarly, rather than using rubber for the individual fingers 62, brushes could be used or alternate flexible and resilient materials could be utilized. Furthermore, rather than using a metallic and curved transfer plate 51, a flat plate 51 may be used, and alternate materials such as plastics could be utilized to form the transfer plate 51. And instead of using secondary stabilizer cylinders 81 and 82, flexible plastic straps could be used as secondary stabilizers.

It is also to be understood that, although the direction of travel 42 of feed conveyor means 40 is shown as perpendicular to the direction of travel 35 of roller conveyor means 20, the two conveyors need not be precisely perpendicular. The two conveyors may be "generally perpendicular" and that phrase means a range of approximately 75° to 115° angular relationship. The preferred angle is 90°, but variations can be made by modifying the shape and orientation of the transfer plate.

What is claimed is:

1. In an automatic corn processing apparatus wherein ears of corn are oriented, singulated and sawn into cobbettes, each of said ears of corn having a longitudinal axis, a butt end and a tip end, the improvement comprising:

conveyor means for conveying ears of corn to a saw, said longitudinal axes of said ears of corn being positioned transversely to the direction of travel of said conveyor means, guide plate means positioned adjacent said conveyor means and extending in the direction of travel of said conveyor means, said guide plate means acting to guide said tip end of each of said ears of corn, feed conveyor means for conveying singulated, oriented ears of corn tip end first along a pathway generally parallel to the longitudinal axes of said ears of corn and perpendicular to the direction of travel of said conveyor means, said feed conveyor means having a discharge end at a point adjacent to and above said conveyor means, said feed conveyor means operating at a sufficiently high rate of speed that said ears of corn would bounce back and become misaligned if said ears abruptly impacted a fixed obstacle with their tip ends, transfer means for receiving said ears of corn discharged from said feed conveyor means, for frictionally contacting said ears of corn to reduce their momentum and to reduce and/or prevent bounce back off said guide plate means and misalignment of said ears of corn and for transferring said ears of corn onto said conveyor means with said tip ends positioned adjacent said guide plate means.

2. The apparatus of claim 1 wherein said ears of corn are launched from said discharge end of said feed conveyor means and wherein said transfer means comprises:

a transfer plate on which said ears of corn land and on which said ears of corn slide until each respective tip end contacts said guide plate means, and a rotating stabilizer drum means mounted for maintaining the alignment of the longitudinal axes of said ears of corn perpendicularly to said guide plate means.

3. The apparatus of claim 2 wherein said rotating stabilizer drum means comprises:

a cylindrical body, and a plurality of flexible fingers extending radially outwardly from said cylindrical body, said flexible fingers being adapted to contact said ears of corn to help reduce their forward momentum.

4. The apparatus of claim 3 wherein said transfer plate has an inlet end and a discharge end, and said transfer plate is curved downwardly so that the distance between said discharge end and said fingers is reduced to a distance wherein said fingers contact said ears of corn to maintain their alignment and to minimize the impact of said ears against said guide plate means.

5. The apparatus of claim 4 wherein the inlet end of said transfer plate is spaced apart from said fingers sufficiently that said fingers do not contact said ears of corn until they have contacted said transfer plate and are sliding across and downwardly on said transfer plate.

6. The apparatus of claim 2 wherein said transfer plate and rotating stabilizer drum means accelerate each ear of corn in a direction perpendicular to its longitudinal axis and in the direction of travel of said conveyor means.

7. The apparatus of claim 2 wherein said rotating stabilizer drum means comprises a plurality of resilient fingers extending angularly towards said guide plate means.

8. The apparatus of claim 1 wherein a portion of said conveyor means is inclined with respect to the horizontal so that the tip ends of said ears of corn are below said butt ends.

9. The apparatus of claim 8 further comprising a generally U-shaped roller carrier plate which supports the inclined portion of said conveyor means.

10. The apparatus of claim 8 wherein a portion of said guide plate means adjacent said inclined portion of said conveyor means is inclined with respect to the horizontal to aid in aligning said tip ends of said ears of corn.

11. In an automatic corn processing apparatus wherein ears of corn are sawn into cobbettes, and wherein each of said ears of corn have a longitudinal axis, a butt end and a tip end, the improvement comprising:

conveyor means for conveying ears of corn to a saw, said longitudinal axes of said ears of corn being positioned transversely to the direction of travel of said conveyor means, guide plate means positioned adjacent said conveyor means and extending in the direction of travel of said conveyor means, said guide plate means acting to guide an end of each of said ears of corn, feed conveyor means for conveying singulated ears of corn along a pathway generally perpendicular to the direction of travel of said conveyor means, said feed conveyor means having a discharge end at a point adjacent to and above said conveyor means, said feed conveyor means operating at a sufficiently high rate of speed that said ears of corn would bounce back and become misaligned if said ears abruptly impacted a fixed obstacle, transfer means for receiving said ears of corn discharged from said feed conveyor means, for frictionally contacting said ears of corn to reduce their momentum and to prevent bounce back off said guide plate means and misalignment of said ears of corn and for transferring each ear of corn onto said conveyor means with an end positioned adjacent said guide plate means.

12. In an automatic corn processing apparatus wherein ears of corn are oriented, singulated and sawn into cobbettes, each of said ears of corn having a longitudinal axis, a butt end and a tip end, the improvement comprising:

feed conveyor means for conveying singulated, oriented ears of corn tip end first along a first pathway generally parallel to the longitudinal axes of said ears of corn, said feed conveyor means having a discharge end, said feed conveyor means operating at a sufficiently high rate of speed that said ears of corn would bounce back and become misaligned if said ears abruptly impacted a fixed obstacle with their tip ends, second conveyor means for conveying ears of corn to a saw along a second pathway generally perpendicular to said first pathway, said longitudinal axes of said ears of corn being positioned transversely to the direction of travel of said second conveyor means, guide plate means positioned adjacent said second conveyor means and extending in the direction of travel of said second conveyor means, said guide plate means acting to guide said tip end of each of said ears of corn, and transfer means for receiving said ears of corn from said discharge end of said feed conveyor means and causing said ears of corn to abruptly change direction for transfer to said second conveyor means, said transfer means frictionally contacting said ears of corn to reduce their momentum in the direction of said first pathway and to reduce and/or prevent bounce back from said guide plate means and subsequent misalignment of said ears of corn.

13. The apparatus of claim 12 wherein said transfer means also causes said ears of corn to accelerate in the direction of said second pathway prior to being transferred to said second conveyor means.

14. The apparatus of claim 12 wherein said feed conveyor means operates at speeds between 150 and 250 feet per minute.

* * * * *